United States Patent Office 3,834,937
Patented Sept. 10, 1974

3,834,937
METHOD OF PREPARING FLAME-RESISTANT PAPER HAVING A HIGH DELAMINATION RESISTANCE
Akira Karimori, Risaku Kodama, and Akio Kato, Fuji, Japan, assignors to Kabushiki Kaisha Kohjin, Tokyo, Japan
No Drawing. Filed Aug. 14, 1972, Ser. No. 280,409
Int. Cl. D21h 1/40
U.S. Cl. 117—155 UA                10 Claims

ABSTRACT OF THE DISCLOSURE

This invention relates to a method of preparing flame-resistant paper having a high delamination resistance characterized by impregnating paper with an oil-in-water dispersion comprising, a synthetic resin, a flame retardant, such as guanidine salts or water-soluble salts of guanylurea, at least one non-ionic surface active agent and, if desired, an alkylketene dimer.

BACKGROUND OF THE INVENTION

It has been known that when paper is impregnated with a latex of a natural rubber or synthetic rubber or a synthetic resin emulsion, the fibers in the paper layers are bonded by the rubber or resin to strengthen the internal bonding strength. This is readily determined by measuring the delamination resistance of the impregnated paper.

It has also been known that flame-resistant paper can be obtained by impregnating paper with a water-soluble flame retardant such as borates, phosphates, sulfamates and ammonium halides or the like.

In view of the foregoing known facts, it would appear that a flame-resistant paper having a high delamination resistance could be obtained by impregnating paper with such latex or emulsion and such flame retardant coincidentally. However, the above-mentioned latex and emulsion are generally unstable when exposed to electrolytes. Therefore, when the above-mentioned flame retardants, which are electrolytes, are merely blended with the latex or emulsion, the dispersion system is destroyed and coagulation occurs in the latex or emulsion. We have conducted research with a view to overcoming such difficulties, which are encountered in conventional techniques and have now arrived at the process of this invention.

SUMMARY OF THE INVENTION

An object of this invention is to obtain a dispersion of a synthetic rubber latex and/or synthetic resin emulsion which has properties such that the dispersion system will not be destroyed by the addition of a flame retardant thereto, and to manufacture a flame resistant paper having a high delamination resistance by impregnating it with a dispersion having this property. The object of this invention can be attained by a method of preparing flame-resistant paper having a high delamination resistance, which comprises soaking paper in a dispersion comprising a dispersed phase of a synthetic rubber and/or a synthetic resin, and if desired, an alkylketene dimer, and a dispersion medium consisting of a solution containing a non-ionic surface active agent as a dispersion stabilizer for the disperse phase and a guanidine salt and/or a water-soluble salt of guanylurea as a flame retardant, thus impregnating the paper with the impregnating composition and incorporating the flame retardant into the paper in the amount to 10 to 50% by weight based on the paper. (In the instant specification, all of the percentages are given by weight.)

DETAILED DESCRIPTION OF THE INVENTION

This invention relates to a method of preparing flame-resistant paper having a high delamination resistance, which comprises soaking paper in a dispersion containing a disperse phase of a synthetic rubber and/or a synthetic resin and, if desired, an alkylketene dimer, and a dispersion medium consisting of an aqueous solution containing a non-ionic surface active agent as a dispersion stabilizer for the dispersed phase and a guanidine salt and/or a water-soluble salt of guanylurea as a flame retardant, thus impregnating the paper with the impregnating composition and incorporating the flame retardant into the paper in the amount of 10 to 50% based on the weight of the paper.

As the synthetic rubber to be used in this invention, butadiene-methylmethacrylate copolymers, styrene-butadiene copolymers, acrylonitrile-butadiene copolymers and chloroprene polymers are preferred, none of which comprise a compound having a polar group such as a carboxyl group.

Preferable examples of the synthetic resin are acrylic acid ester polymers, acrylic acid ester copolymers, copolymers of an acrylic acid ester with styrene or the like, vinyl chloride polymers, vinyl chloride copolymers, vinyl acetate polymers, vinyl acetate copolymers, vinylidene chloride polymers and vinylidene chloride copolymers, each of which is emulsified with a non-ionic emulsion stabilizer.

As the non-ionic surface active agent, polyoxyethylene alkyl ethers and polyoxyethylene alkyl phenol ethers or the like are preferred.

As the guanidine salt, guanidine sulfamate and guanidine phosphate are preferably used. Guanylurea phosphate is preferably used as the water-soluble salt of guanylurea.

The dispersion to be used as the impregnating composition in this invention may be prepared by mixing a preliminarily emulsified synthetic rubber latex and/or a synthetic resin emulsion with an aqueous solution formed by dissolving the nonionic surface-active agent and the flame retardant in water.

An alkylketene dimer may be added to the above dispersed solution so as to impart water resistance and sizing effect to the resultant flame resistant paper.

Further, in order to improve the water resistance of the flame resistant paper, a urea-formaldehyde resin or melamineformaldehyde resin may be added to the above dispersed solution.

In the preparation of the dispersed solution, the order of addition of the components is not critical and a stable dispersion useable in this invention can be formed by conducting the addition in any order. The dispersion produced in this way is used as an impregnating agent for paper in this invention.

The impregnating agent to be used in this invention is in the state of an emulsion. In the emulsion, the synthetic rubber, synthetic resin and alkylketene dimer constitute a disperse phase in the granular form and other components constitute a dispersion medium dissolved in water. The preparation of the impregnating agent must be so conducted that such an emulsion will be attained. In such an impregnating agent, the flame retardant does not react with the synthetic rubber or synthetic resin, but they are both stable. Accordingly, when paper is impregnated with such an impregnating agent, the flame retardant and the synthetic rubber or synthetic resin can be present in the paper in such a form that they do not have an adverse effect on each other. For this reason, it is possible to obtain paper having not only a high delamination resistance owing to the synthetic rubber or synthetic resin, but also a high flame-resistance resulting from the flame retardant, merely by soaking paper in the above-mentioned impregnating agent.

It is desired that the flame retardant in the impregnating agent be incorporated into the starting base paper in the ratio of 10 to 50% based on the paper weight. The amount of the flame retardant to be incorporated is adjusted depending on the basis weight of the base paper. The greater the basis weight of the base paper the lower the ratio of flame retardant to fiber which is required to obtain the flame resistance. Further, the necessary amount of the flame retardant is determined in proportion to the content of easily combustible components. Therefore when easily combustible components, such as synthetic rubber, synthetic resin and alkylketene dimer, are applied to the base paper in large amounts, it is necessary to employ the flame retardant in a relatively large amount.

The necessary amount of the synthetic resin or synthetic rubber fixed onto the paper depends on the desired degree of the delamination strength. When a higher delamination resistance is desired, the synthetic rubber or synthetic resin is supplied in a greater amount. The amount of the alkylketene dimer is adjusted depending on the desired sizing effect. When a higher sizing effect is required, the alkylketene dimer is introduced in a greater amount.

One embodiment of the composition (based on the solids) of the impregnating agent to be used in this invention is as follows:

| | Parts by weight |
|---|---|
| Flame retardant | 20–40 |
| Non-ionic surface active agent | 0.02–0.3 |
| Synthetic rubber and/or synthetic resin | 5–30 |
| Alkylketene dimer | 0–1.5 |
| Melamine-formaldehyde resin or urea-formaldehyde resin | 0–7 |
| Catalyst for melamine-aldehyde resin or urea-formaldehyde resin | Up to 10% based on said resin |

In the preparation of the impregnating agent, both the flame retardant and the non-ionic surface active agent may be dissolved in warm water maintained at 80° C. or lower, but when other components are dissolved simultaneously, it is preferable to maintain the liquid temperature below 30° C. Especially, the effect of the alkylketene dimer sizing agent decreases rapidly with the passage of time when the liquid temperature is high. However, when guanylurea phosphate alone is used as the flame retardant, since its solubility is low, it is preferable to elevate the liquid temperature up to 50° C.

This invention will now be illustrated in more detail by reference to several examples, but the scope of the invention is not limited to the particulars of these examples.

Example 1

An impregnating agent having the composition indicated in Table 1 was prepared by adding a non-ionic surface active agent, a butadiene - methylmethacrylate copolymer latex having a solid content of 47.5% and a 6% emulsion of an alkylketene dimer, in that order, to guanidine sulfamate and water and mixing them to form an impregnating agent of the oil-in-water emulsion type. Bleached kraft pulp made from soft wood was used for the base paper. In order to impart a good wet strength to the base paper for the impregnation treatment, a small amount of a modified polyamide-epichlorohydrin resin was added to the pulp during the paper manufacturing. This base paper was soaked in the above impregnating agent and squeezed so that the amount of the solid incorporated would be 45–50% by weight based on the base paper, and this step was followed by drying at about 120° C. with hot air.

The physical properties of the resulting flame-resistant paper were determined and the obtained results are shown in Table 2.

In the resulting flame-resistant paper, improvement of the delamination resistance was especially conspicuous. The delamination resistance test was conducted according to the method in which a cellophane adhesive tape was applied to each of both surfaces of the sample sheet, laminated layers of the sample paper were peeled by removing the tapes from the sheets, and the resistance to this peeling was measured according to a method described in JIS P–8139 (JIS indicates Japanese Industrial Standard) namely method B for testing the delamination resistance of laminated layers of sheet paper. In accordance with method B of JIS P–8139, one end of a long sample sheet is delaminated into two layers along a short length, delaminated portions are attached to the chuck of a tensile tester and the force required to delaminate the remaining part of the sample is expressed in terms of a tensile load.

The flame resistance of the resulting paper was as good as 2nd Grade, determined according to the combustion test method described in JIS A–1322. According to the method of JIS A–1322, fire is brought into contact with the lower end of a sample sheet inclined at an angle of 45° and the length carbonized is measured. When the length carbonized is 5–10 cm., the flame resistance is defined as 2nd Grade.

The degree of sizing was determined according to the method of testing the Stoeckigt sizing degree of paper described in JIS 8122.

In each of the following Examples, the delamination resistance, the flame resistance and the degree of sizing were determined by the above-mentioned methods.

TABLE 1

| Composition of impregnating agent: | Parts by weight [1] |
|---|---|
| Guanidine sulfamate | 35 |
| Alkylketene dimer | 1 |
| Butadiene-methylmethacrylate copolymer | 10 |
| Polyoxyethylene nonyl phenol ether (non-ionic surface active agent) | 0.1 |
| Water | Balance |
| Total | 100.0 |

[1] Mixing ratio (based on solids).

TABLE 2

| | Physical properties | | | |
|---|---|---|---|---|
| Sample | Weight (g./m.²) | Thickness (mm.) | Sizing degree (seconds) | Delamination resistance [1] |
| Base paper | 81 | 0.15 | 0 | 80 |
| Impregnated paper | 121 | 0.18 | 9 | 220 |

[1] In machine direction, g./15 mm. width.

Example 2

An impregnating agent of the oil-in-water emulsion type having the composition indicated in Table 3 was prepared by adding a non-ionic surface active agent, a butadiene-methylmethacrylate copolymer latex having a solid content of 47.5%, a 6% emulsion of alkylketene dimer, and a melamine-formaldehyde resin and a catalyst therefore in that order, to guanidine sulfamate and water. The same base paper as used in Example 1 was soaked in said impregnating agent, squeezed so that the amount of solids to be incorporated would be 45–50% by weight based on the paper, and dried at about 120° C. to obtain a flame resistant paper. The physical properties of the resulting flame resistant paper were determined yielding the results shown in Table 4 (impregnated paper No. 1). This flame resistant paper was further heat-treated at 120° C. for 2 minutes, and the physical properties of the heat-treated paper were determined to obtain the results shown in Table 4 (impregnated paper No. 2).

In each of the flame resistant papers, the delamination resistance was highly improved over the base paper. The sizing degree and the wet strength were improved to some extent by the heat treatment. Each of the flame resistant papers exhibited a good flame resistance of the 2nd Grade.

TABLE 3

| Composition of impregnating agent: | Parts by weight [1] |
|---|---|
| Guanidine sulfamate | 35 |
| Alkylketene dimer | 1 |
| Melamine-formaldehyde resin | 3 |
| Catalyst for melamine-formaldehyde resin | 0.3 |
| Butadiene-methylmethacrylate copolymer | 10.0 |
| Polyoxyethylene nonyl phenol ether (non-ionic surface active agent) | 0.1 |
| Water | Balance |
| Total | 100.0 |

[1] Mixing ratio (based on solids).

TABLE 4

| Physical properties | Impregnated paper No. 1 | Impregnated paper No. 2 | Base paper |
|---|---|---|---|
| Weight (g./m.²) | 124 | 121 | 83 |
| Thickness (mm.) | 0.18 | 0.18 | 0.15 |
| Tensile strength (machine direction) (kg./15 mm. width) | 5.0 | 5.4 | |
| Wet strength (machine direction) (kg./15 mm. width) | 1.5 | 1.8 | |
| Sizing degree (seconds) | 6.0 | 10 | 0 |
| Delamination resistance (machine direction) (g./15 mm. width) | 220 | 220 | 80 |

Example 3

An impregnating agent of the emulsion type having the composition indicated in table 5 was prepared by adding a non-ionic surface active agent, a 40% emulsion of an acrylic acid ester copolymer containing groups reactive with a melamine-formaldehyde resin, and a melamine-formaldehyde resin and a catalyst therefore in that order, to guanidine sulfamate and water. The same base paper as used in Example 1 was soaked in the resulting impregnating agent, squeezed so that the amount of solids to be incorporated would be 45 to 50% by weight based on the base paper, and thereafter dried by hot air maintained at 130° C. The physical properties of the resulting flame resistant paper are shown in Table 6 (impregnated paper No. 1). In this flame resistant paper improvement in the delamination resistance was observed and during the combustion test of this flame-resistant paper, the length carbonized was 7.0 cm. and the flame resistance was of the 2nd Grade.

Example 4

1 part by weight, reckoned as solids, of a 6% emulsion of an alkylketene dimer was introduced into the impregnating agent prepared in Example 3. The same base paper as used in Example 1 was soaked in the modified impregnating agent, squeezed so that the amount of solids to be incorporated would be 45–50% by weight based on the base paper and dried by hot air maintained at 130° C. The physical properties of the resulting flame resistant paper were tested to obtain the results shown in Table 6 (impregnated paper No. 2). As is seen from Table 6, the resulting flame resistant paper was excellent in sizing and delamination resistance. During the combustion test of the paper, the length carbonized was 7.2 cm. and the flame resistance was of 2nd Grade.

| Composition of impregnating agent: | Parts by weight [1] |
|---|---|
| Guanidine sulfamate | 35 |
| Acrylic acid ester copolymer | 10 |
| Polyoxyethylene lauryl ether (non-ionic surface active agent) | 1.0 |
| Melamine-formaldehyde resin | 2 |
| Organic amine salt catalyst for melamine-formaldehyde resin | 0.2 |
| Water | Balance |
| Total | 100.0 |

[1] Mixing ratio (based on solids).

TABLE 6

| Sample | Physical properties | | | |
|---|---|---|---|---|
| | Weight (g./m.²) | Thickness (mm.) | Sizing degree (seconds) | Delamination resistance [1] |
| Impregnated paper No. 1 | 118 | 0.18 | 4 | 200 |
| Impregnated paper No. 2 | 118 | 0.18 | 21 | 200 |

[1] Machine direction, g./15 mm. width.

EXAMPLE 5

An impregnating agent having a composition indicated in Table 7 was prepared by dissolving guanylurea phosphate and guanidine phosphate into warm water maintained at about 50° C., and adding a non-ionic surface active agent, a 50% emulsion of a vinyl chloride-acrylic ester copolymer and a 6% emulsion of an alkylketene dimer in that order to the solution, while allowing the solution to cool gradually. The temperature of the resulting impregnating agent was maintained at 25–30° C. The same base paper as used in Example 1 was soaked and squeezed so that the amount of solids to be incorporated would be 45–50%, based on the weight of the base paper. Then, the paper was dried by hot air maintained at about 110° C. to obtain a flame resistant paper. The results of tests of physical properties of the flame resistant paper produced in this manner are shown in Table 8. As is seen from Table 8, the paper had a high delamination resistance. During the combustion test of the paper, the length carbonized was 7.5 cm., and the flame resistance was of 2nd Grade.

TABLE 7

| Composition of impregnating agent: | Parts by weight [1] |
|---|---|
| Guanylurea phosphate | 10 |
| Guanidine phosphate | 20 |
| Polyoxyethylene nonyl phenol ether (non-ionic surface active agent) | 0.1 |
| Vinyl chloride-acrylic ester copolymer | 10 |
| Alkylketene dimer | 0.6 |
| Water | Balance |
| Total | 100.0 |

[1] Mixing ratio (based on solids).

TABLE 8

| Sample | Physical properties | | | |
|---|---|---|---|---|
| | Weight (g./m.²) | Thickness (mm.) | Sizing degree (seconds) | Delamination resistance [1] |
| Impregnated paper obtained in Example 5 | 118 | 0.18 | 8 | 150 |

[1] Machine direction, g./15 mm. width.

Example 6

An impregnating agent having the composition indicated in Table 9 was prepared by dissolving guanylurea phosphate in warm water maintained at about 70° C. and adding a non-ionic surface active agent, a 50% emulsion of a vinyl chloride-acrylic ester copolymer, a melamine-formaldehyde resin and a catalyst for the resin in that order for the solution while allowing the solution to cool gradually. The resulting impregnating agent was maintained at about 50° C. and paper into which 5% antimony trioxide has been incorporated by beater addition was impregnated with the impregnating agent and squeezed so that the amount of solids to be incorporated would be 45–50% based on the base paper weight. Results of the tests of physical properties of the resulting flame resistance paper are shown in Table 10. Improvement in the delamination resistance was observed.

TABLE 9

| Composition of impregnating agent: | Parts by weight [1] |
|---|---|
| Guanylurea phosphate | 20 |
| Polyoxyethylene lauryl ether (non-ionic surface agent) | 0.1 |
| Vinyl chloride-acrylic ester copolymer | 9 |
| Melamine-formaldehyde resin | 2 |
| Organic amine salt catalyst for melamine-formaldehyde resin | 0.1 |
| Water | Balance |
| Total | 100.0 |

[1] Mixing ratio (based on solids).

TABLE 10

| | Physical properties | | |
|---|---|---|---|
| Sample | Weight (g./m.$^2$) | Thickness (mm.) | Delamination resistance [1] |
| Impregnated paper | 156 | 0.21 | 150 |
| Base paper | 100 | 0.19 | 75 |

[1] Machine direction, g./15 mm. width.

Examples 7 to 13

Base paper manufactured from a raw pulp composed of 80% kraft pulp and 20% sulfite pulp and a small amount of a melamineformaldehyde resin as a wet strength-improving resin was soaked in an impregnating agent formed by dispersing the compounds indicated in Table 11 in water, and squeezed so that the amount of solids to be fixed would be 45–50% based on the weight of the base paper. Results of the tests of physical properties of the flame resistant papers produced in this manner are shown in Table 12. In each of the flame resistant papers obtained in these Examples, improvement of the delamination resistance was observed. Especially, products of Examples 7, 8 and 10 treated with an impregnating agent comprising an alkylketene dimer were sized and a water-resistance was imparted to them.

TABLE 11

| Impregnating agent composition (parts by weight based on solids) | Example No. | | | | | | |
|---|---|---|---|---|---|---|---|
| | 7 | 8 | 9 | 10 | 11 | 12 | 13 |
| Guanidine sulfamate | 35 | 35 | 35 | 35 | 30 | 35 | 35 |
| Acrylic acid ester polymer | 10 | | | | | | |
| Acrylic acid ester/styrene copolymer | | 10 | | | | | |
| Chloroprene polymer | | | 4 | | | | |
| Butadiene/methylmethacrylate copolymer | | | | 7 | | 5 | 5 |
| Vinyl acetate polymer | | | | | 5 | | |
| Vinyl acetate/vinyl versatate copolymer | | | | | 5 | | |
| Vinylidene chloride polymer | | | | | | 3 | |
| Acrylic ester/vinylidene chloride copolymer | | | | | | 8 | |
| Butadiene/styrene copolymer | | | | | | | 5 |
| Butadiene/acrylonitrile copolymer | | | | | | | 5 |
| Polyoxyethylene nonyl phenol ether (non-ionic surface active agent) | 0.1 | 0.1 | 0.2 | 0.1 | 0.2 | 0.2 | 0.2 |
| Alkylketene dimer | 1.0 | 0.7 | | 1.0 | | | 1.0 |
| Melamine/formaldehyde resin | 2.0 | 2.0 | | | | | |
| Organic amine salt catalyst for melamine/formaldehyde resin | 0.2 | 0.2 | | | | | |
| Urea/formaldehyde resin | | | | | | | 2.0 |
| Organic amine salt catalyst for urea/formaldehyde resin | | | | | | | 0.2 |

What is claimed is:

1. A method of preparing flame resistant paper having a high delamination resistance which comprises the steps of impregnating a base paper with a dispersion consisting essentially of:
   (a) a disperse phase containing at least one strength-increasing agent of butadiene-methyl-methacrylate copolymers, styrene-butadiene copolymers, acrylonitrile-butadiene copolymers, chloroprene polymers, acrylic acid ester polymers, acrylic acid ester copolymers, acrylic acid ester-styrene copolymers, vinyl chloride polymers, vinyl chloride copolymers, vinyl acetate polymers, vinyl acetate copolymers, vinylidene chloride polymers or vinylidene chloride copolymers, and
   (b) a dispersion medium containing an aqueous solution of
      (i) at least one non-ionic surface active agent, and
      (ii) at least one flame retardant salt selected from the group consisting of guanidine salts and water-soluble salts of guanylurea, with the solids in said dispersion comprising 5–30 parts by weight of said strength-increasing agent, 20 to 40 parts by weight of said flame retardant, and 0.02–0.3 part by weight of said non-ionic surface active agent per 100 parts of said dispersion, said flame retardant being incorporated into said impregnated paper in an amount having a weight equal to 10 to 50% of that of the base paper, and subsequently drying the impregnated paper.

2. A method of preparing flame-resistant paper having a high delamination resistance as claimed in Claim 1, wherein said dispersion also comprises an alkylketene dimer constituting less than 1.5 percent of the total weight of said dispersion.

3. A method of preparing flame resistant paper having a high delamination resistance according to Claim 1, which comprises the step of incorporating a urea-formaldehyde resin into said dispersion.

4. A method of preparing flame resistant paper having a high delamination resistance according to Claim 1, which comprises the step of incorporating a melamine-formaldehyde resin into said dispersion.

5. A method of preparing flame resistant paper having a high delamination resistance according to Claim 1, which comprises the step of incorporating a urea-formaldehyde resin and a melamine-formaldehyde resin into said dispersion.

6. A method of preparing flame resistant paper having a high delamination resistance according to Claim 1, which comprises the step of forming the dispersion medium by dissolving said non-ionic surface active agent and said at least one salt in warm water maintained below 80° C.

7. A method of preparing flame resistant paper having a high delamination resistance according to Claim 1, wherein said dispersion is prepared at a temperature lower than 30° C.

8. A method of preparing flame resistant paper having a high delamination resistance according to Claim 1, in which said non-ionic surface active agent is selected from the group consisting of polyoxyethylene alkyl ethers and polyoxyethylene alkyl phenol ethers.

TABLE 12

| Physical properties | Example no. | | | | | | | Base paper |
|---|---|---|---|---|---|---|---|---|
| | 7 | 8 | 9 | 10 | 11 | 12 | 13 | |
| Weight (g./m.$^2$) | 116 | 116 | 117 | 117 | 119 | 118 | 117 | 80 |
| Thickness (mm.) | 0.17 | 0.17 | 0.18 | 0.18 | 0.18 | 0.18 | 0.18 | 0.15 |
| Tensile strength (machine direction) (kg./15 mm. width) | 6.0 | 6.4 | 5.8 | 6.2 | 5.9 | 6.8 | 6.5 | |
| Wet strength (kg./15 mm. width) | 1.5 | 1.5 | 1.1 | 1.2 | 1.3 | 1.3 | 1.2 | |
| Sizing degree (seconds) | 6 | 12 | | 8 | | | | |
| Delamination resistance (machine direction; kg./15 mm. width) | 200 | 210 | 180 | 205 | 170 | 210 | 208 | 84 |
| Length carbonized (cm.) (JIS A-1322 method) | 7.1 | 7.4 | 7.3 | 7.5 | 7.2 | 7.5 | 7.5 | |

9. A method of preparing flame resistant paper having a high delamination resistance according to Claim 1, in which said guanidine salt is selected from the group consisting of guanidine sulfamate and guanidine phosphate.

10. A method of preparing flame resistant paper having a high delamination resistance according to Claim 1, in which guanylurea phosphate is incorporated into said dispersion as a flame retardant while the temperature of said dispersion is maintained at 45–60° C.

References Cited

UNITED STATES PATENTS

| | | | |
|---|---|---|---|
| 2,305,035 | 12/1942 | Rosser | 117—136 |
| 2,488,034 | 11/1949 | Pingree et al. | 117—136 |
| 2,627,477 | 2/1953 | Downey | 117—157 X |
| 2,762,270 | 9/1956 | Keim et al. | 117—157 X |
| 3,054,698 | 9/1962 | Wagner | 117—136 |
| 3,087,836 | 4/1963 | Dearborn | 117—136 |
| 3,471,318 | 10/1969 | Redfarn | 117—136 |
| 3,736,178 | 5/1973 | Sadler et al. | 117—154 X |

WILLIAM D. MARTIN, Primary Examiner

M. R. LUSIGNAM, Assistant Examiner

U.S. Cl. X.R.

117—136, 155 L, 157